(12) United States Patent
Patel

(10) Patent No.: US 6,324,463 B1
(45) Date of Patent: Nov. 27, 2001

(54) CRUISE CONTROL INDICATOR

(76) Inventor: C. Kumar N. Patel, 1171 Roberts La., Los Angeles, CA (US) 90077

( * ) Notice: Subject to any disclaimer, the term of this patent is extended or adjusted under 35 U.S.C. 154(b) by 0 days.

(21) Appl. No.: 09/310,527

(22) Filed: May 12, 1999

Related U.S. Application Data

(60) Provisional application No. 60/085,183, filed on May 12, 1998.

(51) Int. Cl.[7] .............................. G06F 7/00; B60K 31/00
(52) U.S. Cl. ............................. 701/93; 701/70; 180/170; 362/459; 362/489
(58) Field of Search .................................. 701/93, 96, 70, 701/301; 340/438, 441, 815.4; 180/170; 345/30; 362/23, 482, 489, 459

(56) References Cited

U.S. PATENT DOCUMENTS

| | | | |
|---|---|---|---|
| 4,132,284 | * | 1/1979 | Tomecek .............................. 180/179 |
| 5,376,917 | * | 12/1994 | Yoshimoto et al. .................. 340/438 |
| 5,949,346 | * | 9/1999 | Suzuki et al. .................... 340/815.45 |

OTHER PUBLICATIONS

World Wide Web document: Andre, Anthony and Asaf Degani, "Do You Know What Mode You're In? An Analysis of Mode Error In Everyday Things," Interface Analysis Associates, San Jose, CA, San Jose State University, CA, posted at least as early as Jul. 30, 1996.

* cited by examiner

Primary Examiner—William A. Cuchlinski, Jr.
Assistant Examiner—Yonel Beaulieu
(74) Attorney, Agent, or Firm—Sidley Austin Brown & Wood

(57) ABSTRACT

A system for indicating the operational status and parameters of a cruise control system for use in a human operated vehicle. The system includes apparatus for storing and recalling a preset speed for the cruise control system. The system further includes apparatus for indicating this preset speed to the operator, along with apparatus configured to indicate to the user whether or not the cruise control system is engaged. One embodiment is a system for use with vehicles with digital speedometers. In this embodiment, the system includes digital memory for storing the preset speed, and a digital display configured to show the preset speed and the operational status of the cruise control system. Another embodiment is for use with vehicles having analog speedometers. The analog system includes an array of LEDs and detectors arranged around a speed indicating dial and under the speedometer needle. The LEDs and detectors are arranged so that a preset speed may be stored into the system by detection of light reflected from one of the LEDs off a reflective surface on the back side of the needle, and onto one of the detectors. The LEDs of the analog system are further configured to indicate the preset speed and the operational status of the system.

36 Claims, 3 Drawing Sheets

CRUISE CONTROL INDICATOR

This application claims the benefit of U.S. Provisional Application No. 60/085,183, filed on May 12, 1998.

FIELD OF THE INVENTION

This invention relates to cruise control systems and more particularly to automotive cruise control systems which display preset speed information.

BACKGROUND OF THE INVENTION

The cruise control accessory found in many automobiles today can be characterized as a human-machine system. That is, while the cruise control feature offers the operator of a vehicle the benefit of speed control (machine) automation, it also requires significant human interface for its proper and safe operation. In particular, conventional cruise control systems require the operator to (1) turn on the cruise control system (by depressing or rocking a button on the steering wheel or dashboard), (2) achieve the desired cruising speed (by controlling the deflection of the accelerator), and then (3) engage, or set, the cruise control (by pressing another button typically located on the steering wheel or cruise control stalk shift).

Further, the conventional cruise control system is provided with a memory function that stores the set control speed. Thus, applying the brakes to temporarily slow down temporarily disengages the cruise control function. However, re-engaging the cruise control by depressing the "resume" button returns the automobile to the preset, memorized speed. Similarly, temporarily accelerating while the cruise control is engaged, as is done, for example, when passing other vehicles, does not disengage the system. Rather, when the accelerator is released, the automobile slows down until it returns to its set cruising speed and continues at that speed. In fact, the preset, memorized speed is typically canceled only if the cruise control system is turned off (by either depressing the system button or turning off the automobile) or if another speed is set into the memory.

Thus, the conventional cruise control system can be characterized as existing in any one of five modes. Those modes are: (1) cruise control system off—the car's speed is controlled manually; (2) system on, but not engaged—the car's speed is still controlled manually; (3) system on and engaged at a set speed—the car's speed is automatically controlled at the memorized speed; (4) system on and engaged at a set speed but the accelerator is depressed thus increasing the speed of the car—the car's speed is no longer controlled automatically. However, the moment the speed of the vehicle drops to the set speed due to the operator releasing the accelerator, the system jumps back to mode 3; and (5) system on and engaged but the brakes are depressed—the car's speed is no longer controlled automatically but the set speed is still stored in memory and will re-engage to automatic mode 3 upon depressing the "resume" button. It is also apparent that the system is dynamic in that it can jump from mode to mode based on human or machine intervention.

The operator may know which mode the automobile is in at any given moment, but this may not always be the case. While most systems provide visual feedback indicating whether the cruise control system is enabled (identifying if it is in mode 1), typically via a light located within the cruise control button or on the dashboard, this information is of some but minimal value to the operator. They do not, however, inform the operator which mode the automobile is in when the system is enabled (i.e. mode 2, 3, 4, or 5). While no feedback is obviously needed to identify when the system is in mode 3 because the cruise control is automatically controlling the speed, conventional systems do not inform the operator whether they are in fully manual mode 2 or in one of the temporarily manual modes 4 or 5. The operator must rely on his or her memory to know whether the speed at which the vehicle is traveling is only a temporary override of the automatic speed control to be resumed upon releasing the accelerator or depressing the resume button, as the case may be, or is a function of being in fully manual mode 2.

Lacking this knowledge poses potential safety hazards. This can be illustrated by way of several examples. Example 1: The operator was on fully automatic cruise (mode 3) at 60 miles per hour (mph), but then accelerated to 75 mph (mode 4) and kept his/her foot on the accelerator to maintain this speed for several miles. Then, the operator had a need to gradually slow the vehicle down to below 60 mph, say 40 mph, because of a new driving condition, such as heavy traffic, reduced speed limit or exiting the highway. However, by this time, the operator forgot that cruise control was still set for 60 mph, and merely released the accelerator, expecting the vehicle to continue to slow down to 40 mph. This, course, did not happen. The operator's momentary lack of speed control could lead to an accident. Example 2: The operator was in fully automatic cruise control mode (mode 3) but had to step on the brakes to temporarily slow down, thereby disengaging the cruise control (mode 5). Some time elapsed and the operator forgot the preset speed before pressing the resume button. The acceleration to the preset speed may come as a surprise and lead to another hazardous situation.

In sum, there is a definite safety driven need to provide useful, visual feedback to operators of automobiles with cruise control of the preset speeds at which they are set.

SUMMARY OF THE INVENTION

The present invention addresses this need by providing the operator of a vehicle with information about the preset speed of an enabled cruise control system. This is accomplished by equipping the vehicle with a visual feedback system that continuously provides the preset speed memorized by the cruise control system. This invention will tend to enhance the safe operation of a vehicle under cruise control conditions.

In particular, a cruise control system for a vehicle is provided with a speed controller that automatically maintains the vehicle speed at a desired preset speed, an enable switch that enables the system, a set speed input in communication with the controller to manually set the speed of the vehicle to that at which it is traveling at the moment of input, a memory for temporarily storing the speed of the vehicle at the set speed, and a feedback system for displaying the set speed information to the operator of the vehicle until a new set speed is input or the system is disabled.

In one more detailed aspect of the invention, the feedback system of a vehicle designed with a digital speed display, or speedometer, is a second digital display that provides the preset cruise control speed, when the cruise control is enabled and active. In another more detailed embodiment, the feedback system of a vehicle having an analog speedometer includes a plurality of light emitting diodes (LED's) located at various speed intervals on the speedometer dial. The LED corresponding to the speed at which the vehicle was traveling when the cruise control system was set illuminates and remains lit (or blinks) for the benefit of the operator.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENT

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is one preferred specific implementation of an improved cruise control system for an automobile, namely, one that provides continuous visual feedback of the preset speed of the system for the convenience of the operator and for improved safety. The invention, however, may also be applied to other types of transportation means that could utilize a cruise control system.

Automobiles currently provide one of two types of speed displays, namely, the analog display, typically in the form of the traditional speedometer, and the digital display. Accordingly, as detailed below, the present invention provides cruise control speed-indicating solutions for both types of displays. The digital display embodiment is described first.

Figure 1:
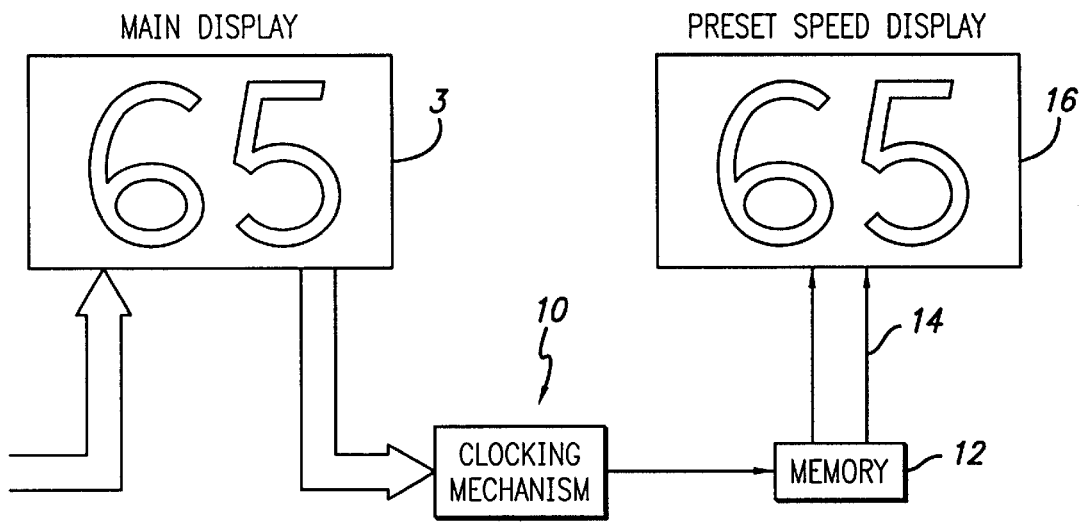
FIG. 1 is schematic of a digital speed display of one embodiment of the present invention.

For vehicles having digital speed displays, the speed information is already in digitized form, such as binary coded decimal (BCD). As shown in the schematic of FIG. 1, a main speed display 3 displays in digital format the current speed at which the vehicle is operating. A clocking mechanism 10, such as an array of logic gates, is provided to write the digitized information regarding the speed at which the vehicle is traveling when the set button is pressed, that is, when the cruise control is engaged, into a digital memory 12, such as a DRAM. Output lines 14 from the memory 12 activate a second smaller and distinctive digital display 16 indicating the preset speed. In the preferred embodiment, the present speed remains continuously lit on the second display 16 from the moment the cruise control is engaged until it is either overridden or shut off. When the cruise control is disengaged by stepping on the brake, for example, to temporarily slow down the vehicle to accommodate a heavy traffic load or a reduced highway speed, the preset display retains the present speed information and blinks at fixed intervals, say, twice per second. This gives the operator a clear indication of the speed to which the vehicle will return when the command to resume speed is applied.

When the cruise control system is first activated, the preset display 16 will blink the number zero indicating an "unset" state of cruise control. Further, if in the engaged state, the operator steps on the accelerator to momentarily (or longer) increase vehicular speed (for passing another vehicle or any other reason), the cruise control will remain engaged as is true of all systems today. However, the operator will always have a clear indication of the speed to which the vehicle will return upon removing the foot from the accelerator, obviating the need to rely on the memory of the operator to know the cruise control speed.

Figure 2:
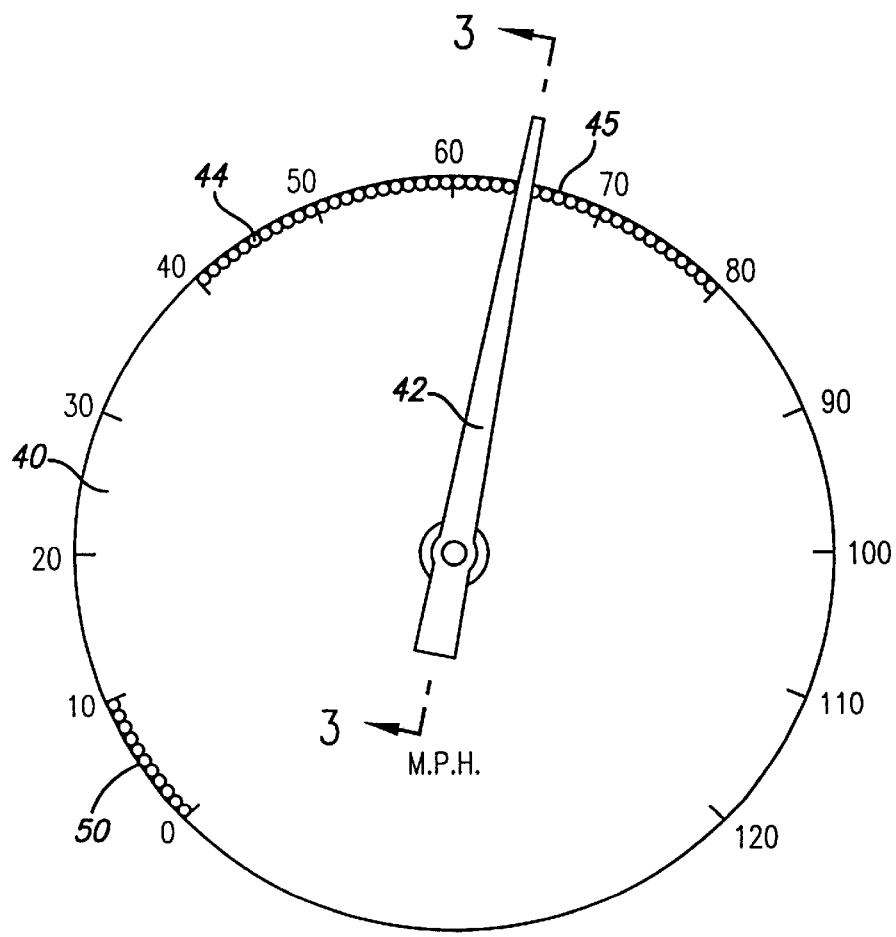
FIG. 2 is a plan view of another embodiment of the present invention, wherein an analog speedometer incorporating a bank of LED detector assemblies is shown.
Figure 3:
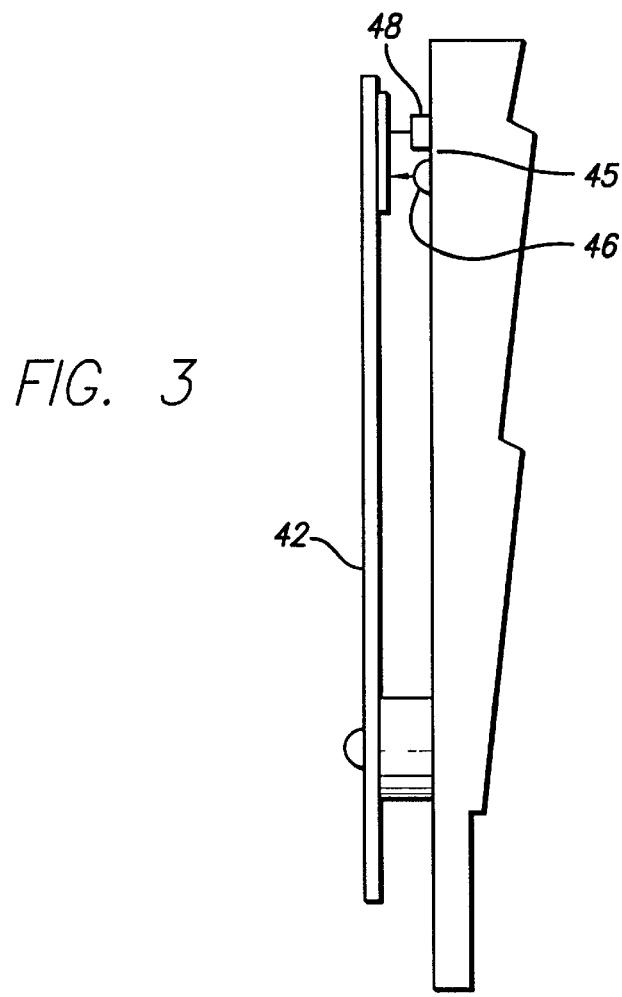
FIG. 3 is a partial side view of the analog speedometer taken along line 3—3 of FIG. 2, wherein an LED detector assembly and speedometer needle are further illustrated.

Referring now to automobiles with analog speed displays, since digitized speed information is not typically available for easy storage, as was described above, a very different approach is used to achieve the same results as in the digital embodiment. As shown in FIG. 2, the preset speed information is displayed right on the analog speed dial, or speedometer 40, itself. In particular, the analog dial 40 which has speed markings thereon, is also provided with a bank 44 of individual light emitting diode (LED) assemblies 45 embedded at the periphery of the dial at every 1 mile per hour (mph) interval. It is understood that other intervals may be used if desired. The bank 44 extends for a portion of the dial corresponding to an expected potential range of cruising speeds, such as from 40 mph to 80 or 90 mph. Referring momentarily to FIG. 3, each LED assembly 45 is comprised of an LED 46 and a detector 48. These assemblies 45, assembled individually or as an entire bank 44, can be easily fabricated on a few semiconductor chips.

Figure 5:
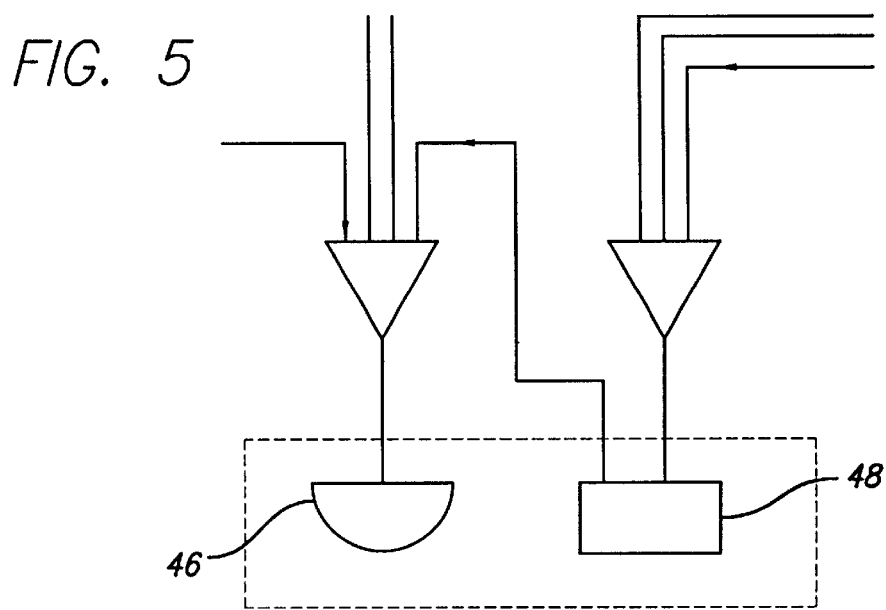
FIG. 5 is a schematic of the LED detector assembly shown in FIGS. 2 and 3.
Figure 4:
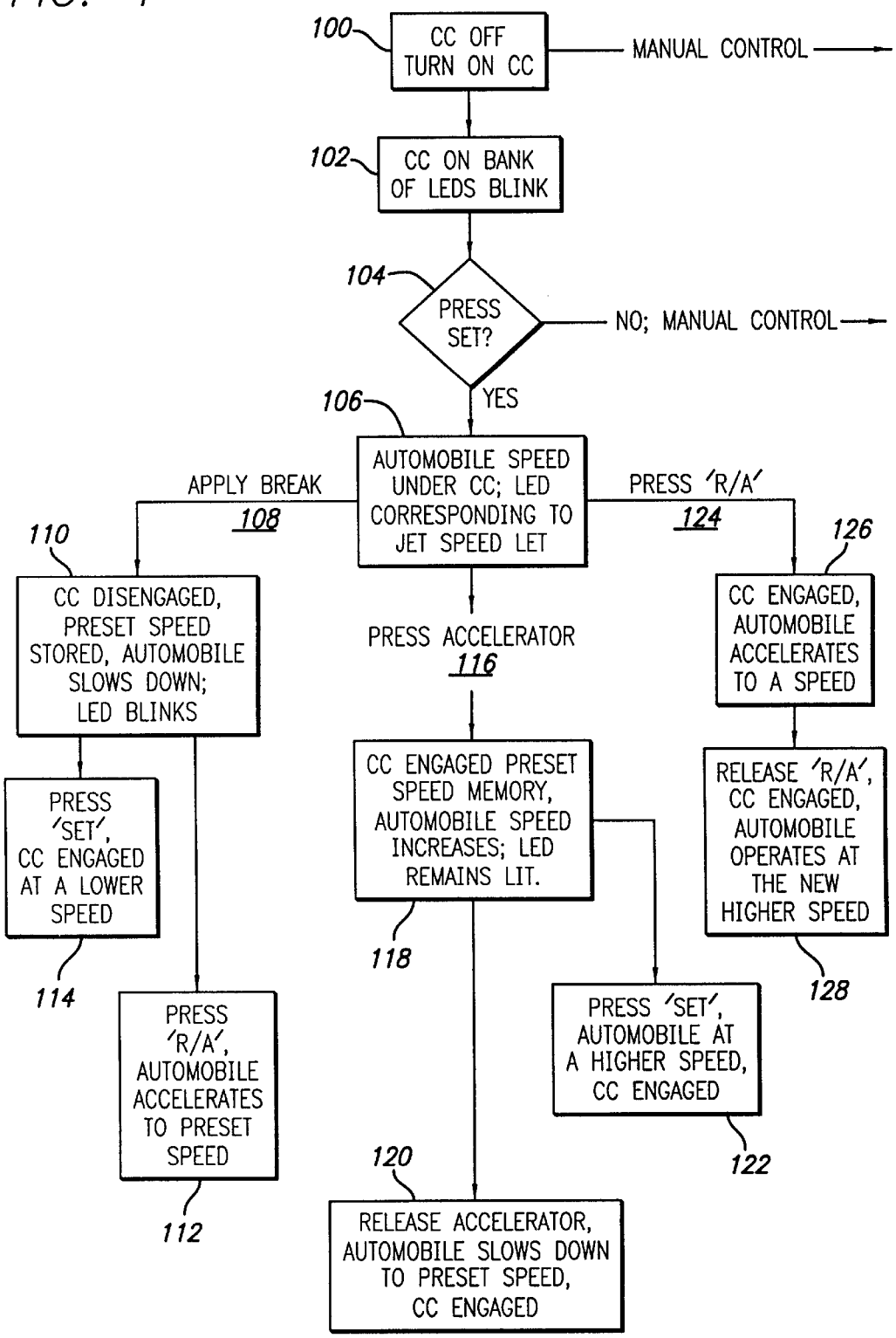
FIG. 4 is a flow chart detailing the various operations of the analog cruise control feedback system shown in FIG. 2.

The operation of the analog embodiment of the present invention is now illustrated with reference to the flow chart shown in FIG. 4, in conjunction with FIGS. 2, 3 and 5.

When the operator starts the vehicle and commences driving, the cruise control (indicated as "CC" in FIG. 4) is off and the automobile is under manual control. When the operator turns on the cruise control in step 100, all of the detectors 48 are off, and the display of the entire bank of LEDs 44 simultaneously blink once (or a small number of present times) to inform the operator that the cruise control is now enabled, step 102. Further, the LED 50, corresponding to the 0 mph mark, remains lit to indicate the cruise control status (i.e. "system on"). At this point, the driver can either continue to operate the automobile under manual control or press the "set speed" button when the desired automobile speed is reached. Pressing the "set speed" button, step 104, activates all of the detectors and all of the LED's momentarily light up. Referring again to FIGS. 2 and 3, the back side of the speed indicator needle 42 is partially reflective for the portion of the needle that sweeps over the bank of LED assemblies 44. Thus, the momentary activation of all LED's results in the LED light reflected back into only that detector 48 over which the partially reflecting needle 42 is located, and only this detector is activated. As shown in FIG. 5, the electrical signal from this detector is then used to activate the corresponding LED which remains lit as long as the cruise control is engaged, step 106. The electronic circuitry needed to maintain the LED lit after the momentary firing of LED and activation of the corresponding detector by a pulse of light is well understood in the art. The vehicle is now operating at a speed controlled by the cruise control.

At this point, there are at least three scenarios that obtain. The first is that the operator steps on the brake, step 108. When the operator steps on the brake for temporary reduction of the vehicular speed on the highway, the cruise control disengages, step 110, and the LED indicating the previously set speed point goes into a blinking mode. This will assure that the operator has the full knowledge of the status of the cruise control, in particular, that it is on but disengaged, with the potential to return the vehicle's speed to the preset speed corresponding to the blinking LED on the dial 40. The operator may continue to drive the vehicle under complete manual control while the preset speed is stored in the cruise control and as indicated by the blinking LED. When the operator presses the "Resume/Accelerate (R/A)" button, step 112, he or she knows the speed to which the vehicle will return. At this point, of course, cruise control is engaged, the LED is steadily lit, and the automobile accelerates to the preset speed.

Alternatively, as shown in step 114, the operator may choose to continue to travel at the new (and now slower) speed. In this case, he or she may press the SET button to re-engage the cruise control. All of the LED's will blink momentarily, all the detectors will be turned on, and only the detector under the new position of the speedometer needle having received the reflected light will be activated. The LED corresponding to the new cruising speed will now remain lit as described earlier.

The second scenario entails the operator stepping on the accelerator, step 116, to increase the vehicular speed in order to pass another vehicle (or any other reason). As shown in step 118, the LED remains lit continuously to indicate the speed to which the vehicle will return once the operator takes her/his foot off the accelerator, as in step 120. For the operator to be able to see the set speed when cruise control is engaged and when the vehicle is moving at the preset speed, this embodiment includes a speedometer indicator needle which is semitransparent over the region where the bank of LED assemblies 44 are located. Thus, the operator can see the continuously lit LED and know that the cruise control is engaged.

Alternatively, as shown in step 122, if desired, the operator can select a new, higher cruising speed by pressing the "set speed" button. In this case, the earlier sequence will repeat, a new LED will be lit, and the automobile speed will be set at a higher speed.

Finally, the third scenario envisions the operator depressing the "Reset/Accelerate" or "R/A" button in step 124 to accelerate the vehicle via the cruise control system, step 126. Following the earlier sequences, the new speed will be set to that which the vehicle was traveling when the "R/A" button was released. This will sequence all of the LED's to blink, all detectors to be activated, and then the LED under the needle to stay lit to indicate the new higher cruising speed, as shown in step 128.

As shown, deployment of the present invention in all vehicles equipped with cruise control will tend to contribute significantly towards safer driving.

Having thus described the basic principles and exemplary embodiments of the invention, it will be apparent that further variations, alterations, modifications, and improvements will also occur to those skilled in the art. For example, it is understood that a vehicle equipped with an analog speedometer may be designed with a digital preset speed indicator. Further, it will be apparent that the present invention is not limited to use in automobiles. It is applicable to any operator-controlled vehicle that may use a human-machine, mobile cruise control system, such as motorcycles, trolleys, water vehicles, etc. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

What is claimed is:

1. A cruise control system for vehicle having a human operator, comprising:
   a speed controller that automatically maintains the vehicle speed at a preset speed;
   an enable switch associated with said controller for enabling the system;
   a set speed input in communication with said controller for manually setting the speed of the vehicle at said preset speed, thereby engaging the system;
   a memory which stores information indicative of said preset speed; and
   a feedback system for communicating said information in said memory to the operator of the vehicle.

2. A cruise control system for a variable speed vehicle controlled by a human operator, comprising:
   (a) a speed controller for automatically maintaining the vehicle at a substantially constant cruising speed selected by the operator;
   (b) a cruise control enable switch associated with the controller for enabling and disabling the controller;
   (c) a set speed input in communication with the controller for selecting the cruising speed of the vehicle when the controller is enabled;
   (d) a memory that stores information representative of the selected cruising speed; and
   (e) a feedback system that substantially continuously communicates the selected cruising speed information to the operator of the vehicle until either the operator selects a subsequent cruising speed or the controller is disabled.

3. The cruise control system of claim 2, wherein the feedback system includes a digital display.

4. The cruise control system of claim 3, wherein the digital display displays a predetermined signal when the controller is initially enabled to indicate the state of the controller.

5. The cruise control system of claim 3, wherein the digital display displays information indicative of the selected cruising speed of the vehicle.

6. A cruise control system for a variable speed vehicle controlled by a human operator, comprising:
   (a) a speed controller for automatically maintaining the vehicle at a substantially constant cruising speed selected by the operator;
   (b) a cruise control enable switch associated with the controller for enabling and disabling the controller;
   (c) a operator-controlled, set speed input in communication with the controller for selecting the cruising speed of the vehicle when the controller is enabled;
   (d) an analog speedometer having a speed dial with speed markers and a rotating speed indicating needle on the dial; and
   (e) a feedback system that detects the position of the speed indicating needle when the cruising speed of the vehicle is selected and that substantially continuously communicates the position of the needle corresponding to that cruising speed until either the operator selects a new cruising speed or the controller is disabled.

7. The cruise control system of claim 6, wherein the feedback system further comprises a bank of light emitting diodes arranged along a portion of the speed dial, each diode positioned to correspond to a given speed indication on the dial, and wherein one of the diodes in the bank emits light corresponding to the selected cruising speed.

8. The cruise control system of claim 7, wherein the feedback system further includes one light emitting diode detector arranged adjacent to each diode in the bank of light emitting diodes, and a light reflective surface on a portion of the side of the speed indicating needle that faces the bank of diodes and that sweeps over the bank of diodes.

9. The cruise control system of claim 8, wherein said feedback system determines the relative position of the speed indicating needle when the cruising speed is selected by detecting reflections from one of the light emitting diodes off the reflective surface of the needle received by an adjacent light emitting diode detector.

10. The cruise control system of claim 8 wherein the bank of light emiting diodes is activated when the enable switch is initially enabled.

11. The cruise control system of claim 9 wherein the feedback system activates one of the light emitting diodes closest to the needle when said enable switch is enabled.

12. A method for visually communicating to the human operator of a vehicle having a cruise control system a cruising speed at which the vehicle is set, comprising:
    determining the speed at which the vehicle is traveling;
    activating the cruise control system at a desired cruising speed;
    displaying a symbol indicative of the speed at which the cruise control system is activated;
    maintaining the activated cruise control speed symbol upon temporary acceleration or deceleration of the vehicle;
    removing said symbol when the cruise control system is deactivated or a new cruising speed is selected.

13. A method for indicating to a human operator of a vehicle having a cruise control system a preset speed for which the cruise control system is set, the method comprising:
    setting the preset speed;
    displaying to the operator a symbol indicative of the preset speed;
    maintaining the display of the symbol indicative of the preset speed; and
    discontinuing display of the symbol indicative of the preset when the cruise control system is deactivated or a new preset speed is selected.

14. The method of claim 13, further comprising:
    displaying a second symbol upon the selection of a new preset speed, said second symbol indicative of the new preset speed.

15. The method of claim 13, further comprising:
    before setting the preset speed, activating the cruise control system; and
    after activating the cruise control system, but before setting the preset speed, indicating to the operator the unset status of the preset speed.

16. The method of claim 15,
    wherein indicating the unset status of the preset speed includes displaying a visual symbol to the operator.

17. The method of claim 16,
    wherein the visual symbol indicating the unset status of the preset speed comprises a blinking "0".

18. A method for indicating to a human operator of a vehicle having a cruise control system a preset speed for which the cruise control system is set, the method comprising:
    setting the preset speed;
    displaying to the operator a symbol indicative of the preset speed while maintaining the vehicle speed at substantially the preset speed;
    maintaining the display of the symbol indicative of the preset speed;
    braking the vehicle;
    upon braking the vehicle, discontinuing maintaining the vehicle speed at substantially the preset speed while keeping data corresponding to the preset speed in a memory device; and
    at a time after braking and during which time the vehicle is not being maintained at substantially the preset speed, displaying to the operator a symbol indicative of the preset speed.

19. The method of claim 18, wherein the symbol indicative of the preset speed displayed at the time after braking and during which time the vehicle is not being maintained at substantially the preset speed, is distinguishable by the operator from the symbol indicative of the preset speed while the vehicle is being maintained at substantially the preset speed.

20. The method of claim 19, wherein the symbol indicative of the preset speed displayed at the time after braking and during which time the vehicle is not being maintained at substantially the preset speed is in the form of a blinking numerical indicator.

21. A method for indicating to a human operator of a vehicle having a cruise control system a preset speed for which the cruise control system is set, the method comprising:
    engaging the cruise control system;
    setting the preset speed;
    displaying to the operator a symbol indicative of the preset speed;
    maintaining the display of the symbol indicative of the preset speed;
    discontinuing display of the symbol indicative of the preset speed after the cruise control system is deactivated or a new preset speed is selected; and
    after the cruise control system is deactivated, displaying a symbol indicative of an unset state of the preset speed.

22. The method of claim 21, wherein the symbol indicative of the unset state of the preset speed is a "0".

23. The method of claim 21, wherein the symbol indicative of the unset state of the preset speed is a blinking numerical indicator.

24. The method of claim 22, wherein the "0" is a blinking "0".

25. A method for indicating to a human operator of a vehicle having a cruise control system a preset speed for which the cruise control system is set, the method comprising:
    setting the preset speed;
    displaying to the operator a symbol indicative of the preset speed;
    accelerating the vehicle to a speed above the preset speed; and
    maintaining the display of the symbol indicative of the preset speed while the vehicle is at the speed above the preset speed.

26. A cruise control system for a variable speed vehicle controlled by a human operator, comprising:

a speed controller for automatically maintaining the vehicle at a substantially constant preset speed;

a set speed input in communication with the controller for selecting the preset speed;

a memory device operable to store information representative of the preset speed;

first visual display apparatus operable to display the indicative of the actual speed of the vehicle; and second visual display apparatus operable to display the visual information indicative of an operation status of the speed controller, wherein the visual information displayable by the second visual display apparatus includes visual information indicative of the preset speed.

27. The cruise control system of claim 26, wherein the visual information displayed by the second visual display apparatus includes information reflecting whether the speed controller is operating to maintain the vehicle at the cruising speed at the time the display is made.

28. The cruise control system of claim 26, wherein the second visual display apparatus comprises a digital numerical indicator.

29. The cruise control system of claim 26, wherein the first visual display apparatus comprises an analog speedometer including a speed indicator operably disposed adjacent an indicator dial; and wherein the second visual display apparatus comprises a plurality of individual visual indicators, wherein each of said individual visual indicators is associated with a particular vehicle speed, and wherein each of said individual visual indicators is operable between and "on" condition and an "off" condition.

30. The cruise control system of claim 29, wherein the individual visual indicators include a plurality of LEDs.

31. The cruise control system of claim 29, wherein the individual visual indicators are disposed on the indicator dial of the analog speedometer.

32. The cruise control system of claim 31, further comprising:

at least one detector operable to detect the position of the speed indicator at a predetermined time; and a memory device operable to store information indicative of the position of the speed indicator at the predetermined time.

33. The cruise control system of claim 32, further comprising:

reflective material disposed on the speed indicator and configured to reflect light emitted by at least one of the individual visual indicators onto at least one of the detectors.

34. A method for providing an operator of a vehicle equipped with a cruise control device with information reflecting the operating status of the cruise control device, comprising:

providing a cruise control device including:
 (a) a speed controller for automatically maintaining the vehicle at a substantially constant preset speed;
 (b) a set speed input in communication with the controller for selecting the preset speed;
 (c) a memory device operable to store information representative of the preset speed;
 (d) first visual display apparatus operable to display the indicative of the actual speed of the vehicle; and
 (e) second visual display apparatus operable to display the visual information indicative of an operation status of the speed controller, wherein the visual information displayable by the second visual display apparatus includes visual information indicative of the preset speed; activating the cruise control device; and operating the second visual display apparatus to indicate the active status of the cruise control device.

35. The method of claim 34, further comprising:

operating the second visual display apparatus to display visual information indicative of the preset speed.

36. The method of claim 35, further comprising:

operating the cruise control device to change the preset speed from a first preset speed to a second preset speed;

operating the second visual display apparatus to display visual information indicative of the second preset speed.

* * * * *

US006324463C1

(12) EX PARTE REEXAMINATION CERTIFICATE (10852nd)
United States Patent
Patel

(10) Number: US 6,324,463 C1
(45) Certificate Issued: Apr. 22, 2016

(54) CRUISE CONTROL INDICATOR

(75) Inventor: C. Kumar N. Patel, Los Angeles, CA (US)

(73) Assignee: Cruise Control Technologies, LLC

Reexamination Request:
No. 90/012,841, Apr. 15, 2013

Reexamination Certificate for:
Patent No.: 6,324,463
Issued: Nov. 27, 2001
Appl. No.: 09/310,527
Filed: May 12, 1999

Related U.S. Application Data

(60) Provisional application No. 60/085,183, filed on May 12, 1998.

(51) Int. Cl.
*B60K 31/18* (2006.01)
*B60T 8/32* (2006.01)
*B60K 31/00* (2006.01)
*B60Q 1/00* (2006.01)

(52) U.S. Cl.
CPC .............. *B60K 31/185* (2013.01); *B60K 31/00* (2013.01); *B60Q 1/00* (2013.01); *B60T 8/32* (2013.01)

(58) Field of Classification Search
None
See application file for complete search history.

(56) References Cited

To view the complete listing of prior art documents cited during the proceeding for Reexamination Control Number 90/012,841, please refer to the USPTO's public Patent Application Information Retrieval (PAIR) system under the Display References tab.

*Primary Examiner* — Mark Sager

(57) ABSTRACT

A system for indicating the operational status and parameters of a cruise control system for use in a human operated vehicle. The system includes apparatus for storing and recalling a preset speed for the cruise control system. The system further includes apparatus for indicating this preset speed to the operator, along with apparatus configured to indicate to the user whether or not the cruise control system is engaged. One embodiment is a system for use with vehicles with digital speedometers. In this embodiment, the system includes digital memory for storing the preset speed, and a digital display configured to show the preset speed and the operational status of the cruise control system. Another embodiment is for use with vehicles having analog speedometers. The analog system includes an array of LEDs and detectors arranged around a speed indicating dial and under the speedometer needle. The LEDs and detectors are arranged so that a preset speed may be stored into the system by detection of light reflected from one of the LEDs off a reflective surface on the back side of the needle, and onto one of the detectors. The LEDs of the analog system are further configured to indicate the preset speed and the operational status of the system.

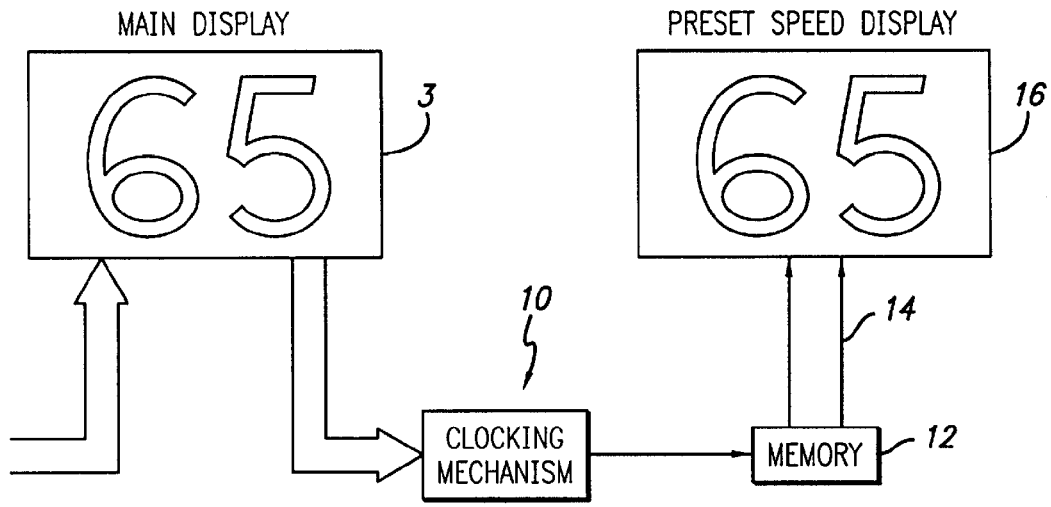

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-3 are cancelled.

New claims 37-39 are added and determined to be patentable.

Claims 1 and 4-36 were not reexamined.

37. *A cruise control system for a variable speed vehicle controlled by a human operator, comprising:*
   *(a) a speed controller for automatically maintaining the vehicle at a substantially constant cruising speed selected by the operator;*
   *(b) a cruise control enable switch associated with the controller for enabling and disabling the controller;*
   *(c) a set speed input in communication with the controller for selecting the cruising speed of the vehicle when the controller is enabled;*
   *(d) a memory that stores information representative of the selected cruising speed; and*
   *(e) a feedback system that substantially continuously communicates the selected cruising speed information to the operator of the vehicle until either the operator selects a subsequent cruising speed or the controller is disabled,*
   *wherein, after braking of the vehicle, the memory stores the information representative of the selected cruising speed, wherein, after braking of the vehicle, the feedback system substantially continuously communicates the selected cruising speed information to a display that displays the selected cruising speed information and,*
   *wherein the visual information indicative of the selected cruising speed information is displayed in a first format after braking of the vehicle and is displayed in a second format when the speed controller is enabled.*

38. *A cruise control system for a variable speed vehicle controlled by a human operator, comprising:*
   *(a) a speed controller for automatically maintaining the vehicle at a substantially constant cruising speed selected by the operator;*
   *(b) a cruise control enable switch associated with the controller for enabling and disabling the controller;*
   *(c) a set speed input in communication with the controller for selecting the cruising speed of the vehicle when the controller is enabled;*
   *(d) a memory that stores information representative of the selected cruising speed; and*
   *(e) a feedback system that substantially continuously communicates the selected cruising speed information to the operator of the vehicle until either the operator selects a subsequent cruising speed or the controller is disabled,*
   *wherein the feedback system communicates to the display visual information indicative of an operation status of the speed controller, and wherein the feedback system substantially continuously communicates to the display visual information indicative of the selected cruising speed information, and*
   *wherein the visual information indicative of the selected cruising speed information is displayed in a first format when the speed controller is disabled and is displayed in a second format when the speed controller is enabled.*

39. *A cruise control system for a variable speed vehicle controlled by a human operator, comprising:*
   *(a) a speed controller for automatically maintaining the vehicle at a substantially constant cruising speed selected by the operator;*
   *(b) a cruise control enable switch associated with the controller for enabling and disabling the controller;*
   *(c) a set speed input in communication with the controller for selecting the cruising speed of the vehicle when the controller is enabled;*
   *(d) a memory that stores information representative of the selected cruising speed; and*
   *(e) a feedback system that substantially continuously communicates the selected cruising speed information to the operator of the vehicle until either the operator selects a subsequent cruising speed or the controller is disabled,*
   *wherein the feedback system includes a digital display, further comprising a digital speedometer displaying a current speed at which the vehicle is operating, and*
   *wherein the memory is a digital memory and wherein the set speed control includes an array of logic gates adapted to write to the digital memory digitized information regarding the current speed at which the vehicle is operating such that the current speed is stored in the digital memory as the selected cruising speed.*

* * * * *